United States Patent
Sun et al.

(10) Patent No.: US 12,432,597 B2
(45) Date of Patent: Sep. 30, 2025

(54) RADIO RESOURCE MANAGEMENT MEASUREMENT METHOD, TERMINAL DEVICE, AND NETWORK DEVICE

(71) Applicant: VIVO MOBILE COMMUNICATION CO., LTD., Guangdong (CN)

(72) Inventors: Yanliang Sun, Chang'an Dongguan (CN); Li Chen, Chang'an Dongguan (CN); Xusheng Wei, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 476 days.

(21) Appl. No.: 17/970,447

(22) Filed: Oct. 20, 2022

(65) Prior Publication Data
US 2023/0040380 A1     Feb. 9, 2023

Related U.S. Application Data

(63) Continuation of application No. PCT/CN2021/088610, filed on Apr. 21, 2021.

(30) Foreign Application Priority Data

Apr. 24, 2020   (CN) .......................... 202010334418.1

(51) Int. Cl.
    H04W 24/10   (2009.01)
    H04W 68/02   (2009.01)
    H04W 76/28   (2018.01)

(52) U.S. Cl.
    CPC ........... *H04W 24/10* (2013.01); *H04W 68/02* (2013.01); *H04W 76/28* (2018.02)

(58) Field of Classification Search
    CPC ..... H04W 24/10; H04W 68/02; H04W 76/28; H04W 52/0216; H04W 48/00;
    (Continued)

(56) References Cited

U.S. PATENT DOCUMENTS

| 10,524,174 B2 | 12/2019 | Li et al. |
| 2016/0360537 A1 | 12/2016 | Palenius et al. |

(Continued)

FOREIGN PATENT DOCUMENTS

| CN | 109315010 A | 2/2019 |
| CN | 109495924 A | 3/2019 |

(Continued)

OTHER PUBLICATIONS

European Search Report issued in corresponding application No. 21792959.5, dated Sep. 18, 2023.

(Continued)

*Primary Examiner* — Charles C Jiang
*Assistant Examiner* — Margaret Marie Anderson
(74) *Attorney, Agent, or Firm* — BROOKS KUSHMAN P.C.

(57) ABSTRACT

This application discloses a radio resource management measurement method, a terminal device, and a network device. The RRM measurement method includes: obtaining indication information from a network, where the indication information is used to indicate a type of RRM measurement behavior of a terminal device in a high-speed scenario, and the type of RRM measurement behavior includes a first type of RRM measurement behavior or a second type of RRM measurement behavior; and in a case that the indication information indicates the first type of RRM measurement behavior, starting RRM measurement of an intra-frequency cell before an eDRX cycle arrives, and receiving a paging message when the eDRX cycle arrives. Therefore, power consumption of the terminal device can be reduced in embodiments of this application.

12 Claims, 4 Drawing Sheets

(58) Field of Classification Search
CPC ... H04W 4/42; H04W 24/02; H04W 52/0212; H04W 24/08; Y02D 30/70
See application file for complete search history.

(56) References Cited

U.S. PATENT DOCUMENTS

| | | | |
|---|---|---|---|
| 2018/0049269 A1* | 2/2018 | Fujishiro | H04W 52/0216 |
| 2018/0167856 A1* | 6/2018 | Li | H04W 76/28 |
| 2019/0150094 A1 | 5/2019 | Liu et al. | |
| 2019/0313475 A1* | 10/2019 | Siomina | H04W 76/28 |
| 2019/0320490 A1 | 10/2019 | Liu et al. | |
| 2020/0275296 A1 | 8/2020 | Chen et al. | |
| 2022/0039046 A1* | 2/2022 | Ianev | H04W 60/00 |

FOREIGN PATENT DOCUMENTS

| | | |
|---|---|---|
| CN | 110139307 A | 8/2019 |
| CN | 110972289 A | 4/2020 |
| CN | 111405643 A | 7/2020 |
| JP | 2018523426 A | 8/2018 |
| WO | 2017/024591 A1 | 2/2017 |
| WO | 2019/199391 A1 | 10/2019 |

OTHER PUBLICATIONS

Japanese Office Action issued in corresponding application No. 2022-564375, dated Jul. 5, 2023.
ETSI MCC., "Report of 3GPP TSG RAN2#107bis meeting," 3GPP TSG-RAN WG2 Meeting #108, R2-1914301, pp. 1-283, (Oct. 18, 2019).
International Search Report and Written Opinion of the International Searching Authority dated Jun. 23, 2021 as received in Application No. PCT/CN2021/088610.
CN Office Action dated Mar. 21, 2023 as received in Application No. 202010334418.1.

* cited by examiner

100

S110

Obtain indication information, where the indication information is used to indicate a type of RRM measurement behavior of a terminal device in a high-speed scenario

S112

In a case that the indication information indicates a first type of RRM measurement behavior, start RRM measurement of an intra-frequency cell before an eDRX cycle arrives, and receive paging when the eDRX cycle arrives

Send indication information, where the indication information is used to indicate a type of RRM measurement behavior of a terminal device in a high-speed scenario

RADIO RESOURCE MANAGEMENT MEASUREMENT METHOD, TERMINAL DEVICE, AND NETWORK DEVICE

CROSS-REFERENCE TO RELATED APPLICATIONS

The present invention is a continuation application of International Application No. PCT/CN2021/088610 filed on Apr. 21, 2021, which claims priority to Chinese Patent Application No. 202010334418.1, filed with the China National Intellectual Property Administration on Apr. 24, 2020, and entitled "RADIO RESOURCE MANAGEMENT MEASUREMENT METHOD, TERMINAL DEVICE, AND NETWORK DEVICE", which is incorporated herein by reference in its entirety.

TECHNICAL FIELD

This application relates to the communications field, and in particular, to a radio resource management (RRM) measurement method, a terminal device, and a network device.

BACKGROUND

For discontinuous reception (DRX), a network side configures a DRX cycle (paging Cycle) in system information. For example, in a paging control channel (PCCH) configuration (PUCCH-config), the network side indicates a current paging cycle of a user terminal (UE), that is, a DRX cycle. The UE wakes up in each DRX cycle to measure a serving cell and monitor paging. At an edge of each cell, when signal quality of the serving cell is lower than a threshold, the UE starts RRM measurement to discover a neighboring cell.

In a high-speed railway scenario, due to fast cell handover, the user equipment (UE) needs to perform relatively intensive RRM measurement at the cell edge. Therefore, although introduction of a single frequency network (SFN) reduces a frequency of cell handover, in comparison with a normal scenario, power consumption of the UE is not reduced, but slightly increased. This is especially disadvantageous for some light UE and greatly shortens a standby time of the UE, for example, a wearable device and a handheld terminal (handheld UE).

In addition, a quantity of antennas of the wearable device is generally 1 Rx, and there is a relatively large performance loss in comparison with 2 Rx of a normal handheld terminal. From a link budget perspective, there is also a performance loss due to a relatively small antenna gain of the wearable device. Therefore, in terms of RRM measurement, it may be necessary to increase a quantity of samples at a physical layer accordingly to ensure measurement accuracy performance of the wearable device. Therefore, power consumption of the wearable device is further increased.

In a process of implementing this application, the inventor finds at least the following problem in the prior art: In a high-speed moving scenario such as a high-speed railway scenario, power consumption of the UE is relatively large in RRM measurement in the prior art.

SUMMARY

An objective of embodiments of this application is to provide a radio resource management (RRM) measurement method, a terminal device, and a network device to resolve a problem that power consumption of a terminal device in RRM measurement is relatively large.

According to a first aspect, an embodiment of this application provides an RRM measurement method, including: obtaining indication information from a network, where the indication information is used to indicate a type of RRM measurement behavior of a terminal device in a high-speed scenario, and the type of RRM measurement behavior includes a first type of RRM measurement behavior or a second type of RRM measurement behavior; and in a case that the indication information indicates the first type of RRM measurement behavior, starting RRM measurement of an intra-frequency cell before an extended discontinuous reception (eDRX) cycle arrives, and receiving paging when the eDRX cycle arrives.

According to a second aspect, an embodiment of this application provides an RRM measurement indication method, including: sending indication information, where the indication information is used to indicate a type of RRM measurement behavior of a terminal device in a high-speed scenario, and the type of RRM measurement behavior includes a first type of RRM measurement behavior or a second type of RRM measurement behavior.

According to a third aspect, an embodiment of this application provides an RRM measurement apparatus, including: an obtaining module, configured to obtain indication information from a network, where the indication information is used to indicate a type of RRM measurement behavior of a terminal device in a high-speed scenario, and the type of RRM measurement behavior includes a first type of RRM measurement behavior or a second type of RRM measurement behavior; and a measurement module, configured to: in a case that the indication information indicates the first type of RRM measurement behavior, start RRM measurement of an intra-frequency cell before an eDRX cycle arrives, and receive a paging message when the eDRX cycle arrives.

According to a fourth aspect, an embodiment of this application provides an RRM measurement indication apparatus, including a sending module, configured to send indication information, where the indication information is used to indicate a type of RRM measurement behavior of a terminal device in a high-speed scenario, and the type of RRM measurement behavior includes a first type of RRM measurement behavior or a second type of RRM measurement behavior.

According to a fifth aspect, an embodiment of this application provides a terminal device, including a processor, a memory, and a program or instructions stored in the memory and capable of running on the processor, where when the program or instructions are executed by the processor, the steps of the method according to the first aspect are implemented.

According to a sixth aspect, an embodiment of this application provides a network device, including a memory, a processor, and a program or instructions stored in the memory and capable of running on the processor, where when the program or instructions are executed by the processor, the steps of the method according to the second aspect are implemented.

According to a seventh aspect, an embodiment of this application provides a readable storage medium, where the readable storage medium stores a program or instructions, and when the program or instructions are executed by a processor, the steps of the method according to the first aspect or the second aspect are implemented.

According to an eighth aspect, an embodiment of this application provides a chip, where the chip includes a processor and a communications interface, the communications interface is coupled to the processor, and the processor is configured to run a program or instructions to implement the method according to the first aspect or the second aspect.

In the embodiments of this application, the indication information indicating the type of RRM measurement behavior of the terminal device in the high-speed scenario is obtained, and in the case that the indication information indicates the first type of RRM measurement behavior, the RRM measurement of the intra-frequency cell is started before the eDRX cycle arrives, and the paging is received when the eDRX cycle arrives. In the technical solutions provided in the embodiments of this application, UE can perform the first type of RRM measurement behavior based on the indication information, start the RRM measurement of the intra-frequency cell before the eDRX cycle arrives, and receive the paging when the eDRX cycle arrives. Therefore, power consumption of the terminal device is reduced, and light UE or other UE with a strong power-saving requirement can achieve a power-saving effect even in the high-speed scenario.

BRIEF DESCRIPTION OF DRAWINGS

The drawings described herein are used to provide a further understanding about the present invention, and constitute a part of the present invention. Exemplary embodiments of the present invention and descriptions thereof are used to explain the present invention, but do not constitute any inappropriate limitation on the present invention. In the accompanying drawings.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of in ordinary skill in the art based on the embodiments of the present invention without creative efforts shall fall within the protection scope of the present invention.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, the term "and/or" in the specification and claims indicates at least one of connected objects, and the character "/" generally represents an "or" relationship between associated objects.

The technical solutions of the present invention may be applied to various communications systems, for example, a global system for mobile communications (GSM), a code division multiple access (CDMA) system, wideband code division multiple access (WCDMA), general packet radio service (GPRS), long term evolution (LTE) or long term evolution advanced (LTE-A), and New Radio (NR).

User equipment (UE), also referred to as a terminal device, a mobile terminal, a mobile terminal device, or the like, may communicate with one or more core networks through a radio access network (RAN). The user equipment may be a mobile terminal, such as a mobile phone (or referred to as a "cellular" phone) or a computer with a mobile terminal, for example, may be a portable, pocket-sized, handheld, computer built-in, or in-vehicle mobile apparatus, or may be a mobile apparatus such as a wearable device (for example, a smart band, smart glasses, or an earphone), which exchanges voice and/or data with the radio access network.

A base station may be a base transceiver station (BTS) in GSM or CDMA, or may be a NodeB in WCDMA, or may be an evolved NodeB (eNB or e-Node B) in LTE or a 5G NodeB (gNB), which is not limited in the present invention. In the following embodiments, the gNB is used as an example for description.

The technical solutions provided by the embodiments of the present invention are hereinafter described in detail with reference to accompanying drawings.

Figure 1:
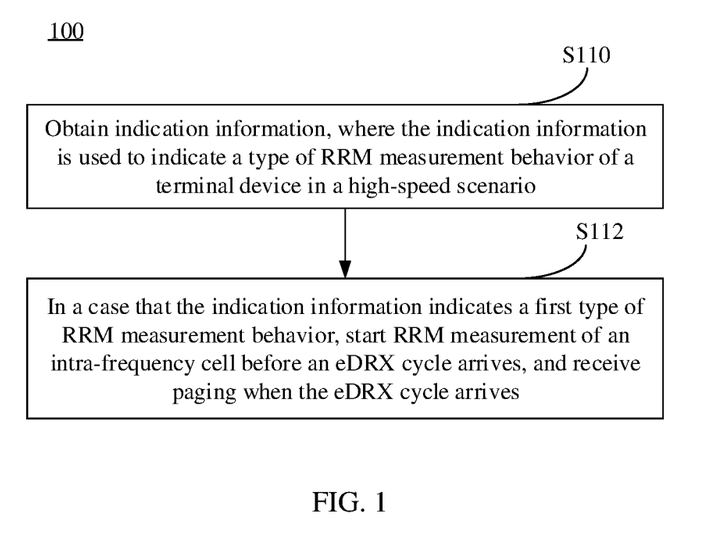
FIG. 1 is a schematic flowchart of an RRM measurement method according to an embodiment of this application.

FIG. 1 is a schematic flowchart of an RRM measurement method according to an embodiment of this application. As shown in FIG. 1, the method may include the following steps.

S110. Obtain indication information, where the indication information is used to indicate a type of RRM measurement behavior of a terminal device in a high-speed scenario, and the type of RRM measurement behavior includes a first type of RRM measurement behavior or a second type of RRM measurement behavior.

In this embodiment of this application, the high-speed scenario is a scenario in which the terminal device moves at a relatively high speed (for example, the speed reaches 350 km/h or 500 km/h), or a scenario in which the terminal device frequently performs cell handover or the terminal device frequently performs RRM measurement, for example, a high-speed railway scenario.

For eDRX, a network side can indicate configurations of an eDRX cycle and a paging monitoring time window (paging time window, PTW). When the eDRX cycle arrives, the UE only needs to perform neighboring cell detection or measurement in one or more PTWs, and monitor paging. An RRM indicator that the UE needs to satisfy in eDRX is largely relaxed. In eDRX, a discovery time of a new cell may be a length of several eDRX cycles ($eDRX_{cycle}$).

In this embodiment of this application, in a tracking area, the network side sends paging messages to UE in all cells. If UE in an idle state performs cell reselection, and a reselected cell belongs to another tracking area, the UE needs to send tracking area update (TAU) information to the network to notify the network that the tracking area changes and trigger the network to further perform a configuration to change a cell to which paging is sent.

In this embodiment of this application, the indication information may be configured by the network side, for example, indicated by the network side by using system information. Therefore, in a possible implementation, the indication information is indicated by using system information, and the indication information is used to indicate the type of RRM measurement behavior of the terminal device before a next eDRX cycle arrives. In other words, in this possible implementation, each cell indicates, in broadcast system information, the type of RRM measurement behavior of the UE before the next eDRX cycle arrives. Before receiving the system information, the UE entering the cell that broadcasts the system information obtains the indication information, and determines to perform the first type of RRM measurement behavior or the second type of RRM measurement behavior.

In the foregoing possible implementation, that the indication information is indicated by using system information includes at least one of the following:

(1) Indicating the indication information by using a first information indication bit in the system information. To be specific, the first information indication bit may indicate that the first type of RRM measurement behavior or the second type of RRM measurement behavior is to be performed by the UE in the high-speed scenario. For example, when the first information indication bit is enabled, it indicates that the RRM measurement behavior of the UE in the high-speed scenario is the second type of measurement behavior, or when the first information indication bit is disabled, it indicates that the RRM measurement behavior of the UE in the high-speed scenario is the first type of measurement behavior.

In addition, the system information may further include a second information indication bit, where the second information indication bit indicates RRM information in the high-speed scenario. The first information indication bit and the second information indication bit may be used independently. For example, if the second information indication bit is enabled, it indicates that the current scenario is the high-speed scenario. For normal UE, a third type of RRM measurement behavior may be performed. For light UE, when the first information indication bit is enabled, the second type of RRM measurement behavior may be performed, or if the first information indication bit is disabled, the first type of RRM measurement behavior is performed. If the second information indication bit is disabled, for normal UE, a fourth type of RRM measurement behavior may be performed; for light UE, if the second information indication bit is disabled, and the first information indication bit is enabled, the light UE may perform a sixth type of RRM measurement behavior; or for light UE, if the second information indication bit is disabled, and the first information indication bit is disabled either, behavior of the light UE is consistent with that in the prior art, and a fifth type of RRM measurement behavior is performed, that is, measurement behavior in the prior art configured with eDRX cycle is performed.

(2) Indicating the indication information by using a second information indication bit in the system information, where the second information indication bit is further used to indicate RRM information in the high-speed scenario. In other words, an RRM information bit in the high-speed scenario in the system information is reused to indicate the indication information. In this possible implementation, the second information indication bit is not only used to indicate whether the current scenario is the high-speed scenario, but also used to indicate the indication information. For example, if the second information indication bit is enabled, it indicates that the current scenario is the high-speed scenario, and the UE is instructed to perform the first type of measurement behavior. In other words, the first type of RRM measurement behavior is performed only in the high-speed scenario (for example, the high-speed railway scenario). If the second information indication bit is disabled, the UE performs a fifth type of RRM measurement behavior, that is, performs the measurement behavior in the prior art configured with eDRX cycle.

(3) Indicating the indication information by using both the first information indication bit and the second information indication bit in the system information. In this possible implementation, the second information indication bit indicates whether the current scenario is the high-speed scenario, and the first information indication bit indicates the type of RRM measurement behavior (the first type of RRM measurement behavior or the second type of RRM measurement behavior), where the information indicated by the first information bit may take effect only when the second information indication bit is enabled, or the first information bit exists only when the second information indication bit is enabled. If the second information indication bit is disabled, behavior of the light UE is consistent with that in the prior art, and the fifth type of RRM measurement behavior is performed.

In the foregoing possible implementation, whether one of the first information indication bit and the second information indication bit is enabled may be that a value of the information indication bit in the system information is a predetermined value. For example, if the information indication bit is one bit, it may be pre-agreed that "1" means enable, and "O" means disable. Alternatively, whether the received system information includes the information indication bit may indicate whether the information indication bit is enabled. For example, it may be pre-agreed that if the received system information includes the information indication bit, the information indication bit is enabled; or if the received system information does not include the information indication bit, the information indication bit is disabled. This is not specifically limited in this embodiment of this application.

Alternatively, the indication information may be configured by the network side by using a non-access stratum (NAS) message. In other words, in another possible implementation, the indication information is indicated by using a NAS message.

In the foregoing possible implementation, optionally, the NAS message may carry a cell list, and the cell list is used to indicate the type of RRM measurement behavior of the terminal device in each cell in a tracking area.

In the high-speed scenario, the UE needs to perform RRM measurement relaxation in most cells in a tracking area. Therefore, to reduce signaling overheads, optionally, the cell list carried in the NAS message may include identity information (cell id) of one or more cells, where the cell list is used to indicate that the first type of RRM measurement behavior is to be performed before the one or more cells are entered; and/or the cell list is used to indicate that the second type of RRM measurement behavior is to be performed after the one or more cells are entered. For example, before detecting a cell indicated by the cell ID in the list, the UE performs the first type of RRM measurement behavior; and after detecting a cell indicated by the cell ID in the list, the UE performs the second type of RRM measurement behavior until the network sends a new cell ID list by using a NAS message. In this possible implementation, the cell corresponding to the cell ID in the cell list may belong to the high-speed railway scenario, that is, the foregoing first information indication bit exists in the system information of the cell corresponding to the cell identity.

S112. In a case that the indication information indicates the first type of RRM measurement behavior, start RRM measurement of an intra-frequency cell before an eDRX cycle arrives, and receive paging when the eDRX cycle arrives, where the intra-frequency cell includes at least one of the following: a serving cell, and an intra-frequency cell neighboring to the serving cell.

In other words, in this embodiment of this application, the first type of RRM measurement behavior refers to starting RRM measurement of the intra-frequency cell before the eDRX cycle arrives, and receiving paging when the eDRX cycle arrives.

In this embodiment of this application, in the case that the indication information indicates the first type of RRM measurement behavior, the UE starts RRM measurement of the intra-frequency cell before the eDRX cycle arrives, and receives paging when the eDRX cycle arrives. By performing the RRM measurement of the intra-frequency cell, the UE can discover a cell to be camped on, and therefore before the eDRX cycle arrives, can receive paging sent by the camped cell. In other words, in this embodiment of this application, the UE determines the first type of RRM measurement behavior based on the indication information from the network, that is, behavior of RRM measurement relaxation. After relaxation, the UE only needs to perform RRM search and measurement of the serving cell and/or the intra-frequency neighboring cell at least before the eDRX cycle arrives, and receive paging.

In a possible implementation, S112 may include: before the eDRX cycle arrives, starting the RRM measurement of the intra-frequency cell to discover a cell to be camped on; and when the eDRX cycle arrives, receiving paging sent in a PTW by the camped cell. In this possible implementation, before the eDRX cycle arrives, the UE starts the RRM measurement of the intra-frequency cell, as long as cell reselection performed after the RRM measurement can discover and reselect the cell to be camped on and ensure reception of the paging in the PTW. Specifically, a specific time to start the RRM measurement before the eDRX cycle arrives is not limited in this embodiment of this application.

In a possible implementation, the method further includes: in a case that the indication information indicates the second type of RRM measurement behavior, determining an RRM measurement cycle based on a DRX parameter broadcast in the system information, and performing the RRM measurement of the intra-frequency cell based on the RRM measurement cycle. In other words, if the behavior determined by the UE based on the indication information is the second type of RRM measurement behavior, the RRM measurement cycle is determined based on a normal DRX parameter in the system information, and at least RRM measurement of the serving cell and/or intra-frequency neighboring cell needs to be performed based on this cycle. To be specific, the second type of RRM measurement behavior refers to determining the RRM measurement cycle based on the DRX parameter broadcast in the system information, and performing the RRM measurement of the intra-frequency cell based on the RRM measurement cycle.

In the foregoing possible implementation, optionally, the performing the RRM measurement of the intra-frequency cell based on the RRM measurement cycle may include: performing the RRM measurement based on a paging cycle indicated by the DRX parameter. In this possible implementation, the paging may be received based on the eDRX cycle. In other words, in this possible implementation, a neighboring cell detection and measurement cycle is the paging cycle indicated by normal DRX, but the UE still receives paging based on the eDRX cycle.

In the foregoing possible implementation, optionally, the performing the RRM measurement of the intra-frequency cell based on the RRM measurement cycle may include: if a DRX cycle indicated by the DRX parameter broadcast in the system information is less than or equal to a first value, performing the RRM measurement based on a second value. In other words, if the DRX cycle indicated by the DRX parameter is less than or equal to the first value, the RRM measurement is performed based on the second value regardless of the specific DRX cycle indicated by the DRX parameter. The first value and the second value may be determined based on an actual application. For example, the first value is 1.28 s and the second value is 0.32 s.

According to the technical solution provided in this embodiment of this application, the UE determines the type of current RRM measurement behavior based on the indication of the indication information, and in a case of determining to perform the first type of RRM measurement behavior, starts the RRM measurement of the intra-frequency cell before the eDRX cycle arrives, and receives paging when the eDRX cycle arrives, so that the network side can determine, based on a location of each cell, RRM measurement behavior to be performed by UE in each cell. Therefore, power consumption of RRM measurement performed by the UE can be reduced, and standby time of the UE can be increased.

It should be noted that the RRM measurement method provided in this embodiment of this application may be performed by an RRM measurement apparatus, or a control module in the RRM measurement apparatus for performing the RRM measurement method. The RRM measurement method provided in this embodiment of this application is described by using the RRM measurement apparatus for performing the RRM measurement method as an example in this embodiment of this application.

Figure 2:
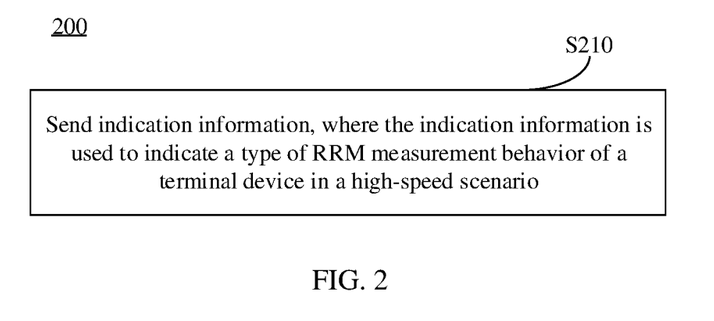
FIG. 2 is a schematic flowchart of an RRM measurement indication method according to an embodiment of this application.

FIG. 2 is a schematic flowchart of an RRM measurement indication method according to an embodiment of this application. The method 200 corresponds to the method 100. As shown in FIG. 2, the method may include the following step.

S210. Send indication information, where the indication information is used to indicate a type of RRM measurement behavior of a terminal device in a high-speed scenario, and the type of RRM measurement behavior includes a first type of RRM measurement behavior or a second type of RRM measurement behavior.

In a possible implementation, corresponding to the method 100, the sending indication information may include: sending system information to indicate the indication information by using the system information, where the indication information is used to indicate the type of RRM measurement behavior of the terminal device before a next eDRX cycle arrives. In other words, in this possible implementation, the indication information is indicated by using the system information. By using this possible implementation, the system information sent in each cell may indicate the type of RRM measurement behavior of the terminal device.

In the foregoing possible implementation, indicating the indication information by using the system information includes at least one of the following:

indicating the indication information by using a first information indication bit in the system information;

indicating the indication information by using a second information indication bit in the system information, where the second information indication bit is used to indicate RRM information in the high-speed scenario; and indicating the indication information by using both the first information indication bit and the second information indication bit in the system information.

In another possible implementation, the sending indication information may alternatively include: sending a NAS message, where the NAS message is used to indicate the indication information. In other words, in this possible implementation, the indication information is sent by using the NAS message. By using this possible implementation, the indication information can be sent to the UE in advance.

In the foregoing possible implementation, the NAS message may carry a cell list, and the cell list is used to indicate the type of RRM measurement behavior of the UE in each cell in a tracking area. In other words, in this possible implementation, the NAS message may carry a cell identity list used to indicate the type of RRM measurement behavior to be performed by the UE in each cell.

Optionally, the cell list includes identity information of one or more cells, where the cell list is used to indicate that the first type of RRM measurement behavior is to be performed by the terminal device before the one or more cells are entered; and/or the cell list is used to indicate that the second type of RRM measurement behavior is to be performed after the one or more cells are entered.

For example, in the high-speed scenario, the non-access stratum (NAS) message is used to indicate a list of cell IDs to the UE; then, before the UE detects a cell corresponding to a cell identity in the list, the UE performs the first type of RRM measurement behavior, that is, performs RRM measurement relaxation of a serving cell and/or an intra-frequency neighboring cell; and after detecting the cell corresponding to the cell identity in the list, the UE performs the second type of RRM measurement behavior, that is, does not perform RRM measurement relaxation of the serving cell and/or the intra-frequency neighboring cell, until a network side sends a new cell ID list by using a NAS message. In this possible implementation, the cell corresponding to the cell identity may belong to a dedicated network in the high-speed scenario, that is, an RRM information indication in the high-speed scenario exists in the system information of the cell corresponding to the cell identity.

Other details in the method 200 can be implemented in a manner corresponding to the method 100, and are not described herein again.

In this embodiment of this application, the network side indicates the type of RRM measurement behavior of the terminal device by using the indication information, so that the type of RRM measurement behavior of the terminal device can be determined based on information such as a location of the cell. Therefore, power consumption of the terminal device is reduced, and a standby time of the terminal device is increased.

It should be noted that the RRM measurement indication method provided in this embodiment of this application may be performed by an RRM measurement indication apparatus, or a control module in the RRM measurement indication apparatus for performing the RRM measurement indication method. The RRM measurement indication method provided in this embodiment of this application is described by using the RRM measurement indication apparatus for performing the RRM measurement indication method as an example in this embodiment of this application.

Figure 3:
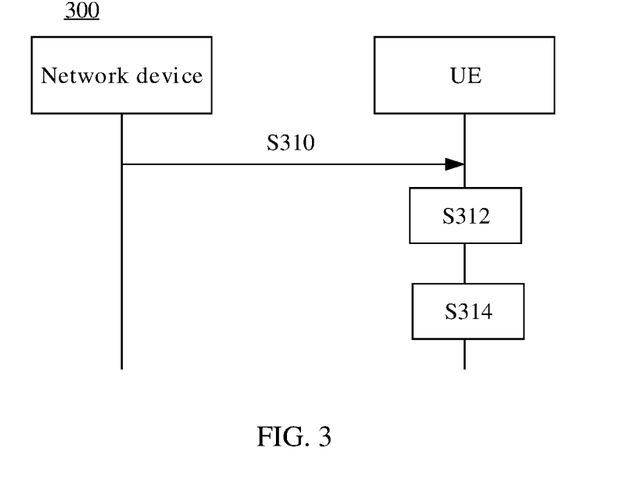
FIG. 3 is another schematic flowchart of an RRM measurement indication method according to an embodiment of this application.

FIG. 3 is another schematic flowchart of an RRM measurement indication method according to an embodiment of this application. The method 300 may be performed by a network device and a terminal. In other words, the method may be performed by software or hardware installed on the network device and the terminal device. As shown in FIG. 3, the method may include the following steps.

S310. Send indication information, where the indication information is used to indicate a type of RRM measurement behavior of a terminal device in a high-speed scenario, and the type of RRM measurement behavior includes a first type of RRM measurement behavior or a second type of RRM measurement behavior.

This step is the same as S210 in the method 200. For details, refer to the description of S210 in the method 200.

In this embodiment of this application, a network device may determine, based on locations of cells, cells in which the UE is to perform the first type of RRM measurement behavior, to reduce power consumption of the UE.

Figure 4:
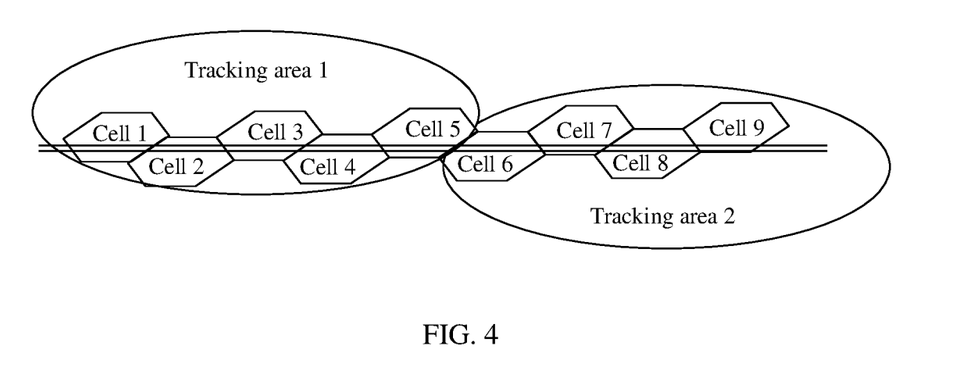
FIG. 4 is a schematic diagram of an application scenario according to an embodiment of this application.

For example, in a high-speed railway scenario shown in FIG. 4, when moving from left to right, the UE sequentially goes through 9 cells: a cell 1 to a cell 9. Assuming that a vehicle speed is 500 km/h, it is impossible for the UE to directly reach the cell 6 belonging to a tracking area 2 from the cell 3 belonging to a tracking area 1 in one eDRX cycle. Therefore, for a first tracking area, the network device can indicate that the UE is to perform the first type of RRM measurement behavior in cells 1, 2, and 3. In cells 4 and 5, because the UE will reach an edge of the tracking area, to ensure that the UE can initiate a TAU in time at the edge of the tracking area, the network device can indicate that the UE is to perform the second type of RRM measurement behavior in the cells 4 and 5, and determine, based on a normal DRX cycle, a quantity of samples at least to be measured.

In a possible implementation, the network device may send the indication information by using system information. For example, in FIG. 4, each cell may set an information indication bit in the broadcast system information to indicate the type of RRM measurement behavior of the UE before a next eDRX cycle arrives.

In a possible implementation, the information bit may be an RRM information indication bit in the high-speed scenario. In other words, the UE considers that the current high-speed scenario belongs to the same tracking area, and in the current high-speed scenario, UEs configured with eDRX can all perform measurement relaxation, that is, perform the first type of RRM measurement behavior. Unless the UE exits the high-speed scenario at a relatively low speed, for example, when a vehicle enters a station at a low speed, the UE reselects cells on other frequencies when the eDRX cycle arrives, instead of a frequency of a dedicated network in the high-speed scenario, and the UE performs a TAU to notify the network that the UE exits the high-speed tracking area. Then the UE performs RRM measurement of a serving cell or an inter-frequency neighboring cell based on an eDRX measurement indicator defined in a common network. It should be noted that, in a non-high-speed scenario, the UE needs to measure more frequencies than in the high-speed scenario, but mobility requirements are greatly relaxed.

In the foregoing possible implementation, the network device sets a second information indication bit in the system information to indicate whether the UE configured with eDRX is to perform the first type of RRM measurement behavior. The second information indication bit takes effect or a value indicated by the indication bit takes effect only when a first information indication bit takes effect. In this way, a plurality of tracking areas may be included along a high-speed railway, and this is more suitable for supporting cases similar to an inter-provincial high-speed railway.

In another possible implementation, the network device sets a first information indication bit in the system information to indicate whether the UE configured with eDRX can perform the first type of RRM measurement behavior, and the first information indication bit not only takes effect in the high-speed scenario but also can take effect in a normal scenario. However, in normal scenarios other than the high-speed scenario, the first information indication bit may also indicate that the UE is to perform the first type of RRM measurement behavior. For example, the UE is not at a cell edge, or the UE is in a low-speed state. A threshold defined by a related protocol is used to determine the UE in the low-speed state or not at the cell edge.

Alternatively, in another possible implementation, the indication information may be a NAS message. Optionally, the NAS message not only indicates the type of RRM measurement of the UE, but also indicates a list of cell identities (cell id). The list indicates that the UE is to perform the first type of RRM measurement behavior before entering a cell whose cell ID is in the list, that is, to perform RRM measurement relaxation of a serving cell and/or an intra-frequency neighboring cell; and to perform the second type of RRM measurement behavior after the cell ID in the list, that is, not to perform the RRM measurement relaxation of the serving cell and/or the intra-frequency neighboring cell. The NAS message may be a TAU accept message.

Correspondingly, the cell corresponding to the cell ID may belong to the dedicated network in the high-speed scenario, that is, the RRM information indication in the high-speed scenario exists in the system information thereof.

S312. The terminal device obtains the indication information.

This step is the same as S110 in the method 100. For details, refer to the description in S110.

S314. In a case that the indication information indicates the first type of RRM measurement behavior, start RRM measurement of an intra-frequency cell before an eDRX cycle arrives, and receive paging when the eDRX cycle arrives, where the intra-frequency cell includes at least one of the following: a serving cell, and an intra-frequency cell neighboring to the serving cell. In a case that the indication information indicates the second type of RRM measurement behavior, an RRM measurement cycle is determined based on a DRX parameter broadcast in the system information, and the RRM measurement of the intra-frequency cell is performed based on the RRM measurement cycle.

According to the technical solution provided in this embodiment of this application, power consumption of the UE can be reduced, and standby time of the UE can be increased.

For example, in FIG. 4, assuming that the network does not configure eDRX for the UE, that is, the UE is in a normal DRX state, the UE needs to perform neighboring cell detection and update at an edge of each cell; complete cell reselection when signal quality of a neighboring cell signal satisfies a condition, and receive a paging message in a new cell; and when cell reselection occurs at an edge of a tracking area, that is, during handover from the cell 5 to the cell 6 in the figure, it is necessary to perform access in the cell 6 and send TAU information. In this case, for some light UE with relatively low transmission and/or reception performance, to achieve a unified measurement accuracy requirement, there are more synchronization signal block (sync signal block, SSB) samples that need to be measured.

For example, in an existing protocol, with a DRX length of 0.32 s defined, a quantity of samples to be measured by UE is at least 8, that is, 8 DRX cycles are required to complete reselection. In this case, for light UE, the synchronization signal block needs to be measured for a plurality of times and combined, and a quantity of required samples may increase by about 3 to 4 times, that is, 24 to 32 samples are required to ensure measurement accuracy.

Therefore, the UE determines a measurement time based on a DRX cycle length configured by the network. A possible implementation option is that when the network configures DRX cycles of 0.32 s, 0.64 s, and 1.28 s respectively, quantities of samples at least to be measured by the light UE are different from those to be measured by normal UE. For example, the quantities are 24, 12, and 7 respectively. In other words, a detection and measurement time at least to be satisfied by the light UE is 0.32×24 or 0.64×12 or 1.28×7. Another possible implementation option is that no matter how the network configures the DRX cycle, the UE always performs wakeup and neighboring cell measurement based on the DRX cycle of 0.32 s. In this case, the light UE considers that a quantity of samples at least to be measured is constantly K. In other words, a detection and measurement time at least to be satisfied by the light UE is K×0.32 s. It can be learned that if the network is not configured with eDRX, power consumption of the light UE is even higher than that of the normal UE.

Assuming that the network is configured with eDRX, the UE needs to ensure that the UE can successfully receive paging when waking up in each PTW. If the network further configures an indication bit in the system information to indicate that the UE can perform the first type of RRM measurement behavior, that is, the UE only needs to perform RRM search and measurement of the serving cell and/or the neighboring cell at least before waking up in the extended DRX cycle, to satisfy reception of paging. Because the eDRX cycle is relatively long, in a high-speed environment, when the UE wakes up in most eDRX cycles, the serving cell of the UE inevitably changes, and the UE needs to perform intra-frequency cell detection again and complete reselection. For example, assuming that the last serving cell of the UE is the cell 1, after an eDRX cycle, the UE may wake up in the cell 4. In this case, the UE needs to perform cell reselection to reselect the cell 4 and receive paging.

It should be noted that the UE needs to perform cell measurement and reselection based on an implementation requirement of the UE. Specific behavior characteristics, for example, how long it takes to complete cell reselection, are not limited in this embodiment of this application. The UE only needs to ensure successful reception of a paging message. For example, if transmission and reception performance of the UE is relatively poor, it is generally considered that more cell detection and cell reselection need to be performed in advance and maintained for a period of time. A specific time advance is not limited in this embodiment of this application.

For example, assuming that the vehicle speed is 500 km/h, it is impossible for the UE to directly reach the cell 6 belonging to the tracking area 2 from the cell 3 belonging to the tracking area 1 in one eDRX cycle. The UE performs the first type of RRM measurement behavior in the cells 1, 2, and 3 based on the indication from the network. In the cells 4 and 5, the UE needs to determine, based on a normal DRX cycle, a quantity of samples at least to be measured, and further determine measurement duration that must be satisfied, that is, perform the second type of RRM measurement behavior. Therefore, the UE can initiate a TAU in time at the edge of the tracking area to ensure that paging is not lost.

Figure 5:
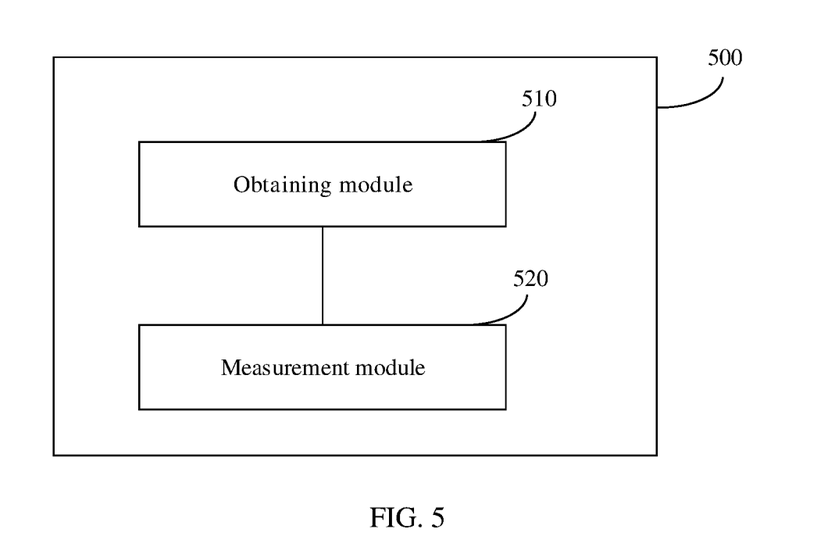
FIG. 5 is a schematic structural diagram of an RRM measurement apparatus according to an embodiment of this application.

FIG. 5 is a schematic structural diagram of an RRM measurement apparatus according to an embodiment of this application. As shown in FIG. 5, the RRM measurement apparatus 500 includes: an obtaining module 510, configured to obtain indication information from a network, where the indication information is used to indicate a type of RRM measurement behavior of a terminal device in a high-speed scenario, and the type of RRM measurement behavior includes a first type of RRM measurement behavior or a second type of RRM measurement behavior; and a measurement module 520, configured to: in a case that the indication information indicates the first type of RRM measurement behavior, start RRM measurement of an intra-frequency cell before an eDRX cycle arrives, and receive paging when the eDRX cycle arrives.

The intra-frequency cell includes at least one of the following: a serving cell and an intra-frequency neighboring cell.

In a possible implementation, that the measurement module starts RRM measurement of an intra-frequency cell before an eDRX cycle arrives, and receives a paging message when the eDRX cycle arrives includes: before the eDRX cycle arrives, starting the RRM measurement of the intra-frequency cell to discover a cell to be camped on; and when the eDRX cycle arrives, receiving paging sent in a PTW by the camped cell.

In a possible implementation, the indication information is indicated by using system information, and the indication information is used to indicate the type of RRM measurement behavior of the terminal device before a next eDRX cycle arrives.

In a possible implementation, that the indication information is indicated by using system information includes at least one of the following:
  indicating the indication information by using a first information indication bit in the system information;
  indicating the indication information by using a second information indication bit in the system information, where the second information indication bit is used to indicate RRM information in the high-speed scenario; and
  indicating the indication information by using both the first information indication bit and the second information indication bit in the system information.

In a possible implementation, the indication information is indicated by using a non-access stratum NAS message.

In a possible implementation, the NAS message carries a cell list, and the cell list is used to indicate the type of RRM measurement behavior of the terminal device in each cell in a tracking area.

In a possible implementation, the cell list includes identity information of one or more cells, where the cell list is used to indicate that the first type of RRM measurement behavior is to be performed before the one or more cells are entered; and/or the cell list is used to indicate that the second type of RRM measurement behavior is to be performed after the one or more cells are entered.

In a possible implementation, the measurement module 520 is further configured to: in a case that the indication information indicates the second type of RRM measurement behavior, determine an RRM measurement cycle based on a DRX parameter in the system information, and perform the RRM measurement of the intra-frequency cell based on the RRM measurement cycle.

In a possible implementation, the performing the RRM measurement of the intra-frequency cell based on the RRM measurement cycle includes: performing the RRM measurement based on a paging cycle indicated by the DRX parameter.

In a possible implementation, the performing the RRM measurement of the intra-frequency cell based on the RRM measurement cycle includes: if a DRX cycle indicated by the DRX parameter broadcast in the system information is less than or equal to a first value, performing the RRM measurement based on a second value.

In a possible implementation, the first value is 1.28 s and the second value is 0.32 s.

The RRM measurement apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in this embodiment of this application.

The RRM measurement apparatus in this embodiment of this application may be an apparatus having an operating system. The operating system may be an Android operating system, an iOS operating system, or other possible operating systems, and is not specifically limited in this embodiment of this application.

The RRM measurement apparatus provided in this embodiment of this application can implement each process implemented by the RRM measurement apparatus in the method embodiments in FIG. 1 to FIG. 4, with the same technical effect achieved. To avoid repetition, details are not described herein again.

Figure 6:
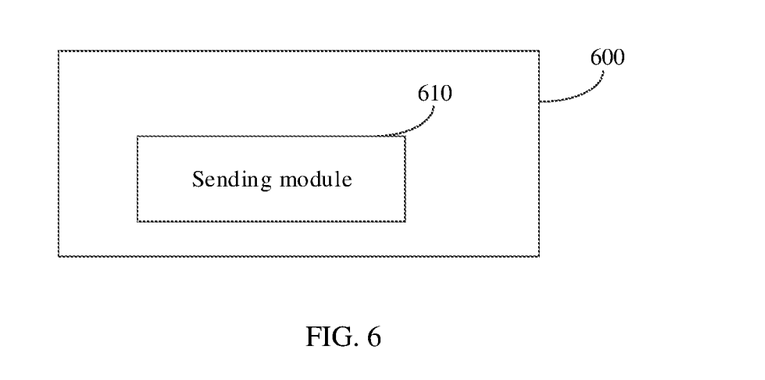
FIG. 6 is a schematic structural diagram of an RRM measurement indication apparatus according to an embodiment of this application.

FIG. 6 is a schematic structural diagram of an RRM measurement indication apparatus according to an embodiment of this application. As shown in FIG. 6, the RRM measurement indication apparatus 600 includes a sending module 610, configured to send indication information, where the indication information is used to indicate a type of RRM measurement behavior of a terminal device in a high-speed scenario, and the type of RRM measurement behavior includes a first type of RRM measurement behavior or a second type of RRM measurement behavior.

In a possible implementation, that the sending module 610 sends indication information includes: sending system information to indicate the indication information by using the system information, where the indication information is used to indicate the type of RRM measurement behavior of the terminal device before a next eDRX cycle arrives.

In a possible implementation, indicating the indication information by using the system information includes at least one of the following:
  indicating the indication information by using a first information indication bit in the system information;
  indicating the indication information by using a second information indication bit in the system information, where the second information indication bit is used to indicate RRM information in the high-speed scenario; and indicating the indication information by using both the first information indication bit and the second information indication bit in the system information.

In a possible implementation, the sending indication information includes: sending a NAS message, where the NAS message is used to indicate the indication information.

In a possible implementation, the NAS message carries a cell list, and the cell list is used to indicate the type of RRM measurement behavior of the terminal device in each cell in a tracking area.

In a possible implementation, the cell list includes identity information of one or more cells, where the cell list is used to indicate that the first type of RRM measurement behavior is to be performed by the terminal device before the one or more cells are entered; and/or the cell list is used to indicate that the second type of RRM measurement behavior is to be performed after the one or more cells are entered.

The RRM measurement indication apparatus in this embodiment of this application may be an apparatus, or may be a component, an integrated circuit, or a chip in the network device. The apparatus may be a base station or may be a core network device.

The RRM measurement indication apparatus in this embodiment of this application may be an apparatus having an operating system. The operating system may be an Android operating system, an iOS operating system, or other possible operating systems, and is not specifically limited in this embodiment of this application.

The RRM measurement indication apparatus provided in this embodiment of this application can implement each process implemented by the RRM measurement indication apparatus in the method embodiments in FIG. 1 to FIG. 4, with the same technical effect achieved. To avoid repetition, details are not described herein again.

Figure 7:
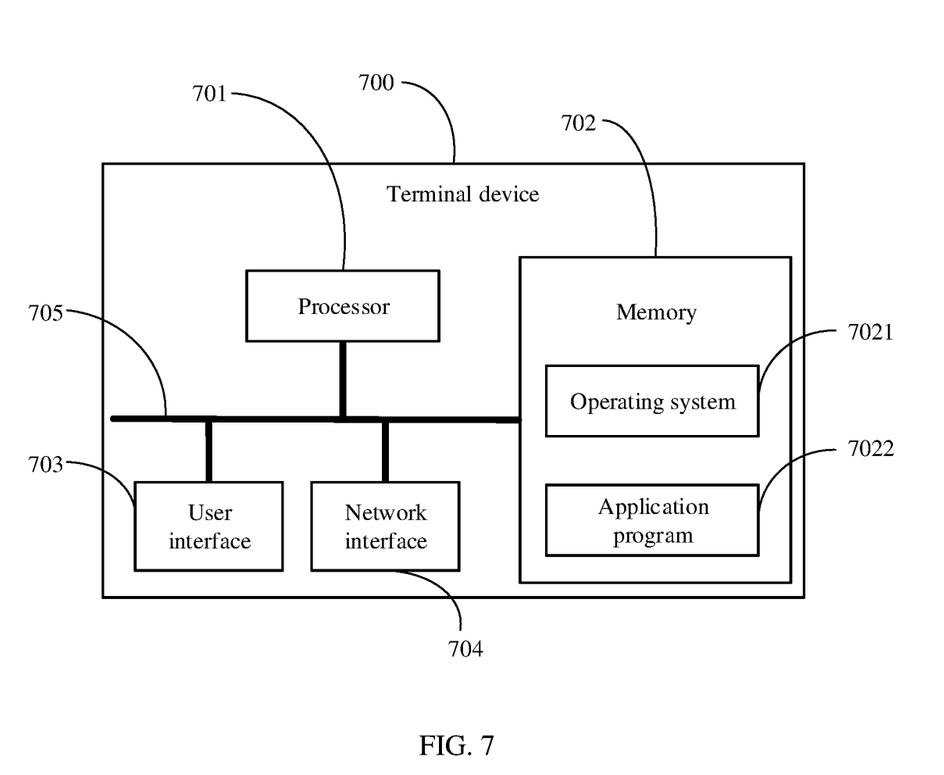
FIG. 7 is a schematic structural diagram of another terminal device according to an embodiment of this application.

FIG. 7 is a block diagram of a terminal device according to an embodiment of this application. The terminal device 700 shown in FIG. 7 includes at least one processor 701, a memory 702, at least one network interface 704, and a user interface 703. The components in the terminal device 700 are coupled together through a bus system 705. It can be understood that the bus system 705 is configured to implement connection and communication between these components. In addition to a data bus, the bus system 705 further includes a power bus, a control bus, and a status signal bus. However, for clarity of description, various buses are marked as the bus system 705 in FIG. 7.

The user interface 703 may include a display, a keyboard, a pointing device (for example, a mouse or a trackball), a touch panel or a touchscreen, or the like.

It may be understood that the memory 702 in this embodiment of this application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), and an electrically erasable programmable read-only memory (Electrically EPROM, EEPROM), or a flash memory. The volatile memory may be a random access memory (RAM), which is used as an external cache. For illustrative rather than restrictive description, a plurality of forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synchlink dynamic random access memory (Synch Link DRAM, SLDRAM), and a direct rambus random access memory (Direct Rambus RAM, DRRAM). The memory 702 in a system and method described in this embodiment of this application is intended to include but is not limited to these and any other suitable types of memories.

In some implementations, the memory 702 stores the following elements: executable modules or data structures, or a subset thereof, or an extended set thereof: an operating system 7021 and an application program 7022.

The operating system 7021 includes various system programs, such as a framework layer, a core library layer, and a driver layer, for implementing various basic services and processing hardware-based tasks. The application program 7022 includes various application programs, such as a media player, and a browser, and is configured to implement various application services. A program for implementing the method in the embodiment of this application may be included in the application program 7022.

In this embodiment of this application, the terminal device 700 further includes a program or instructions stored in the memory 702 and capable of running on the processor 701. When the program or instructions are executed by the processor 701, the following steps are implemented:

obtaining indication information, where the indication information is used to indicate a type of RRM measurement behavior of the terminal device in a high-speed scenario, and the type of RRM measurement behavior includes a first type of RRM measurement behavior or a second type of RRM measurement behavior; and in a case that the indication information indicates the first type of RRM measurement behavior, starting RRM measurement of an intra-frequency cell before an extended discontinuous reception eDRX cycle arrives, and receiving paging when the eDRX cycle arrives.

The foregoing method disclosed in the embodiment of this application may be applied to the processor 701, or implemented by the processor 701. The processor 701 may be an integrated circuit chip that has a signal processing capability. During implementation, the steps of the foregoing method may be completed by hardware integrated logic circuits in the processor 701 or instructions in the form of software. The processor 701 may be a general-purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform various methods, steps, and logical block diagrams that are disclosed in the embodiments of this application. The general-purpose processor may be a microprocessor or any regular processor. The steps of the methods disclosed with reference to the embodiments of this application may be directly performed and completed by using a hardware decoding processor, or may be performed and completed by using a combination of hardware and a software module in a decoding processor. The software module may be located in a computer-readable storage medium that is mature in the art, such as a random access memory, a flash memory, a read-only memory, a programmable read-only memory or electrically erasable programmable memory, or a register.

The computer-readable storage medium is located in the memory 702, and the processor 701 reads information in the memory 702, and completes the steps of the foregoing method in combination with its hardware. Specifically, the computer-readable storage medium stores a program or instructions, and when the program or instructions are executed by the processor 701, the steps of the foregoing method 100 are implemented.

It may be understood that the embodiments described in the embodiments of this application may be implemented by hardware, software, firmware, middleware, microcode, or a combination thereof. For hardware implementation, the processing unit may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in the present invention, or a combination thereof.

For software implementation, the technologies described in the embodiments of this application may be implemented by modules (for example, processes or functions) that perform the functions described in the embodiments of this application. Software code may be stored in the memory and executed by the processor. The memory may be implemented in or outside the processor.

The terminal device 700 can implement each process of the foregoing method 100, with the same effect achieved. To avoid repetition, details are not described herein again.

Figure 8:
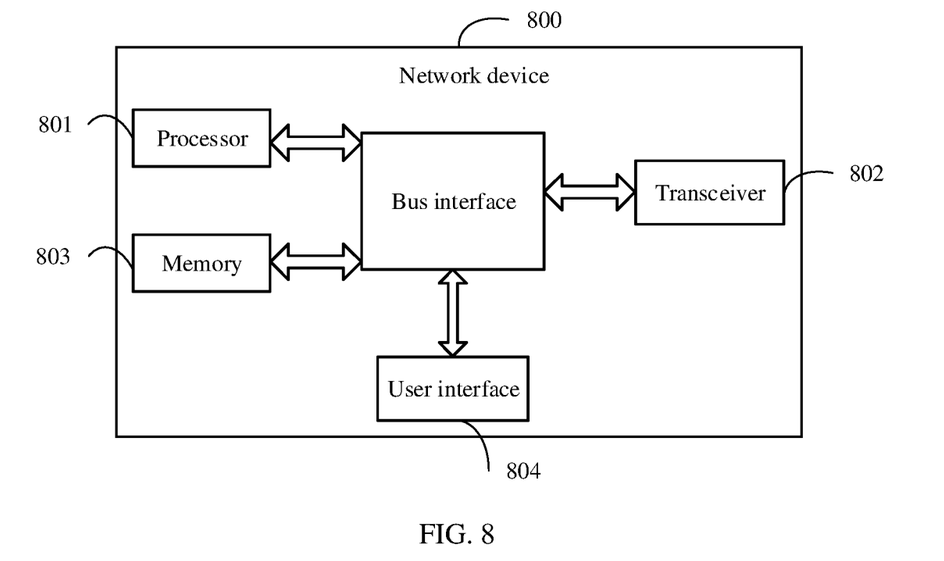
FIG. 8 is a schematic structural diagram of another network device according to an embodiment of this application.

FIG. 8 is a structural diagram of a network device to which an embodiment of this application is applied. The network device can implement details of the method 200, with the same effect achieved. As shown in FIG. 8, the network device 800 includes a processor 801, a transceiver 802, a memory 803, a user interface 804, and a bus interface.

In this embodiment of this application, the network device 800 further includes a program or instructions stored in the memory 803 and capable of running on the processor 801. When the program or instructions are executed by the processor 801, the following step is implemented:

sending indication information, where the indication information is used to indicate a type of RRM measurement behavior of a terminal device in a high-speed scenario, and the type of RRM measurement behavior includes a first type of RRM measurement behavior or a second type of RRM measurement behavior.

In FIG. 8, a bus architecture may include any quantity of interconnect buses and bridges, and specifically connects together circuits that are of one or more processors represented by the processor 801 and of a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium. For different user equipment, the user interface 804 may also be an interface that can be externally or internally connected to a required device. The connected device includes but is not limited to a keypad, a display, a speaker, a microphone, a joystick, and the like.

The processor 801 is responsible for management of the bus architecture and general processing, and the memory 803 is capable of storing data that is used by the processor 801 during operation.

The network device 800 can implement each process of the foregoing method 100, method 200, or method 300, with the same effect achieved. To avoid repetition, details are not described herein again.

An embodiment of this application further provides a readable storage medium. The readable storage medium stores a program or instructions. When the program or instructions are executed by a processor, each process of the foregoing method 100, method 200, and method 300 is implemented, with the same technical effect achieved. To avoid repetition, details are not described herein again. The readable storage medium is, for example, a read-only memory (ROM for short), a random access memory (RAM for short), a magnetic disk, or an optical disc.

In addition, an embodiment of this application provides a chip, where the chip includes a processor and a communications interface, the communications interface is coupled to the processor, and the processor is configured to run a program or instructions to implement each process of the foregoing RRM measurement method embodiment and RRM measurement indication method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings. However, the present invention is not limited to the foregoing specific embodiments. The foregoing specific embodiments are merely illustrative rather than restrictive. Inspired by the present invention, a person of ordinary skill in the art can still derive a plurality of variations without departing from the essence of the present invention and the protection scope of the claims. All these variations shall fall within the protection scope of the present invention.

What is claimed is:

1. A radio resource management (RRM) measurement method, comprising:
   obtaining indication information, wherein the indication information is used to indicate a type of RRM measurement behavior of a terminal device in a high-speed scenario, and the type of RRM measurement behavior comprises a first type of RRM measurement behavior or a second type of RRM measurement behavior; and
   in a case that the indication information indicates the first type of RRM measurement behavior, starting RRM measurement of an intra-frequency cell before an extended discontinuous reception (Edrx) cycle arrives, and receiving a paging message when the eDRX cycle arrives;
   wherein the indication information is indicated by using a non-access stratum (NAS) message;
   wherein the NAS message carries a cell list, and the cell list is used to indicate the type of RRM measurement behavior of the terminal device in each cell in a tracking area.

2. The method according to claim 1, wherein the starting RRM measurement of an intra-frequency cell before an eDRX cycle arrives, and receiving paging when the eDRX cycle arrives comprises:
   before the eDRX cycle arrives, starting the RRM measurement of the intra-frequency cell to discover a cell to be camped on; and
   when the eDRX cycle arrives, receiving paging sent in a paging monitoring time window PTW by the camped cell.

3. The method according to claim 1, wherein the cell list comprises identity information of one or more cells, wherein
   the cell list is used to indicate that the first type of RRM measurement behavior is to be performed before the one or more cells are entered; and/or
   the cell list is used to indicate that the second type of RRM measurement behavior is to be performed after the one or more cells are entered.

4. The method according to claim 1, wherein the method further comprises:
   in a case that the indication information indicates the second type of RRM measurement behavior, determining an RRM measurement cycle based on a DRX parameter in the system information, and performing the RRM measurement of the intra-frequency cell based on the RRM measurement cycle.

5. The method according to claim 4, wherein the performing the RRM measurement of the intra-frequency cell based on the RRM measurement cycle comprises:
   performing the RRM measurement based on a paging cycle indicated by the DRX parameter.

6. The method according to claim 4, wherein the performing the RRM measurement of the intra-frequency cell based on the RRM measurement cycle comprises:
   if a DRX cycle indicated by the DRX parameter broadcast in the system information is less than or equal to a first value, performing the RRM measurement based on a second value.

7. The method according to claim 6, wherein the first value is 1.28 s and the second value is 0.32 s.

8. An RRM measurement indication method, comprising:
   sending indication information, wherein the indication information is used to indicate a type of RRM measurement behavior of a terminal device in a high-speed scenario, and the type of RRM measurement behavior comprises a first type of RRM measurement behavior or a second type of RRM measurement behavior;
   wherein the sending indication information comprises:
   sending a NAS message, wherein the NAS message is used to indicate the indication information;
   wherein the NAS message carries a cell list, and the cell list is used to indicate the type of RRM measurement behavior of the terminal device in each cell in a tracking area.

9. The method according to claim 8, wherein the cell list comprises identity information of one or more cells, wherein
   the cell list is used to indicate that the first type of RRM measurement behavior is to be performed by the terminal device before the one or more cells are entered; and/or
   the cell list is used to indicate that the second type of RRM measurement behavior is to be performed after the one or more cells are entered.

10. A terminal device, comprising a memory, a processor, and a program or instructions stored in the memory and capable of running on the processor, wherein the processor executes the program or instructions to perform:
    obtaining indication information, wherein the indication information is used to indicate a type of RRM measurement behavior of a terminal device in a high-speed scenario, and the type of RRM measurement behavior comprises a first type of RRM measurement behavior or a second type of RRM measurement behavior; and
    in a case that the indication information indicates the first type of RRM measurement behavior, starting RRM measurement of an intra-frequency cell before an extended discontinuous reception (Edrx) cycle arrives, and receiving a paging message when the eDRX cycle arrives;
    wherein the indication information is indicated by using a non-access stratum (NAS) message;
    wherein the NAS message carries a cell list, and the cell list is used to indicate the type of RRM measurement behavior of the terminal device in each cell in a tracking area.

11. A network device, comprising a memory, a processor, and a program or instructions stored in the memory and capable of running on the processor, wherein
    the processor executes the program or instructions to implement the steps of the method according to claim 8.

12. A readable storage medium, wherein the readable storage medium stores a program or instructions, and a processor executes the program or instructions to implement:
    the steps of the method according to claim 1.

* * * * *